United States Patent
Faust et al.

(10) Patent No.: US 6,331,195 B1
(45) Date of Patent: Dec. 18, 2001

(54) COANDA WATER EXTRACTOR

(75) Inventors: Michael B. Faust; Faress H. Rahman; Philippe H. Adam, all of Redondo Beach, CA (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/315,210

(22) Filed: May 19, 1999

Related U.S. Application Data

(60) Provisional application No. 60/086,356, filed on May 20, 1998.

(51) Int. Cl.[7] .................... B01D 45/12; F25D 9/00
(52) U.S. Cl. .................... 55/396; 55/397; 55/399; 55/447; 55/456; 96/191; 62/86; 62/401; 62/DIG. 5
(58) Field of Search ................ 55/391, 392, 394, 55/396, 397, 399, 441, 447, DIG. 17, DIG. 23, DIG. 14, 456, 457, 321, 319, 348, 455, 423; 95/269; 62/86, 87, 401, 402, DIG. 5; 96/191

(56) References Cited

U.S. PATENT DOCUMENTS

| | | | |
|---|---|---|---|
| 2,193,209 | * | 3/1940 | Sandberg ................ 55/394 |
| 3,603,062 | * | 9/1971 | Robbins et al. ........... 55/348 |
| 3,713,279 | * | 1/1973 | Moore ................... 55/319 |
| 3,884,660 | * | 5/1975 | Perry, Jr. et al. .......... 55/396 |
| 3,885,934 | * | 5/1975 | Eads et al. .............. 55/457 |
| 3,895,930 | * | 7/1975 | Campolong .............. 55/394 |
| 3,902,876 | * | 9/1975 | Moen et al. ............. 55/248 |
| 4,008,059 | * | 2/1977 | Monson et al. ........... 55/396 |
| 4,179,273 | | 12/1979 | Montusi . |
| 4,550,573 | * | 11/1985 | Rannenberg ............. 62/401 |
| 4,681,610 | | 7/1987 | Warner . |
| 4,966,005 | | 10/1990 | Cowell et al. . |
| 5,885,333 | * | 3/1999 | Dix ..................... 55/396 |
| 5,887,445 | * | 3/1999 | Murry et al. ............ 62/402 |
| 6,056,798 | * | 5/2000 | Cox ..................... 55/319 |
| 6,070,418 | * | 6/2000 | Crabtree et al. .......... 62/86 |
| 6,083,291 | * | 7/2000 | Okada et al. ............ 55/396 |

FOREIGN PATENT DOCUMENTS

| | | |
|---|---|---|
| 27 02148 A | 7/1978 | (DE) . |
| WO 81 01110 A | 4/1981 | (WO) . |
| WO 93 24204 A | 12/1993 | (WO) . |

* cited by examiner

*Primary Examiner*—Duane Smith
*Assistant Examiner*—Jason M. Greene
(74) *Attorney, Agent, or Firm*—William J. Zak, Jr., Esq.

(57) ABSTRACT

A water extractor of an environmental control system includes a swirl section and a water collector downstream the swirl section. The water collector includes an upstream sump having an inlet positioned to capture the bulk of water droplets leaving the swirl section. The water collector further includes a downstream sump for capturing water droplets that were not captured by the first sump.

20 Claims, 2 Drawing Sheets

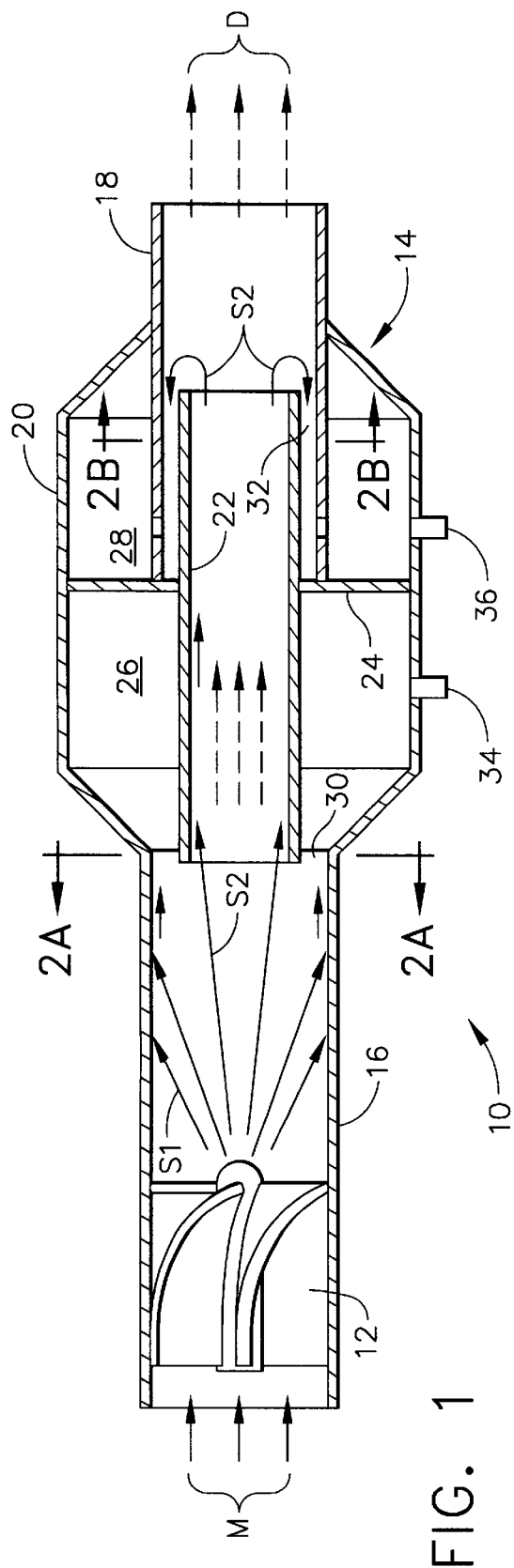

COANDA WATER EXTRACTOR

This application claims the benefit of provisional application Ser. No. 60/086,356 filed on May 20, 1998.

BACKGROUND OF THE INVENTION

The invention relates to environmental control systems. More specifically, the invention relates to water removal apparatus for an aircraft environmental control system ("ECS").

Most aircraft air environmental control systems operate on an air cycle refrigeration principle. Compressed air is obtained from a source (such as a compressor section of an aircraft main engine), cooled with ambient air to near-ambient temperature in an air-to-air heat exchanger and then expanded in an air cycle machine to provide a stream of cooled, conditioned air. Water entrained in the air is typically removed by a water extractor. Cooled, conditioned air leaving the environmental control system is supplied to a passenger cabin. Although somewhat expanded, the conditioned air also pressurizes the cabin.

A high pressure water extractor typically removes the entrained water prior to expansion in the air cycle machine, whereas a low pressure water extractor typically removes the entrained water following expansion in the air cycle machine. If the air cycle machine has two cooling stages (i.e., a high pressure stage and a low pressure stage), mid-pressure water separation may be performed on air expanded by the high pressure stage, but prior to expansion in the low pressure stage.

There is an ongoing need to reduce the weight of an aircraft. Reducing the aircraft weight would reduce in-flight fuel consumption which, in turn, would reduce operating costs. Therefore, it would be desirable to reduce the weight of the water extractor to help meet this need.

It would also be desirable to reduce the size (primarily length) of the water extractor. Reducing the size of the water extractor would reduce the size of the environmental control system and thereby make the environmental control system easier to fit in the aircraft. The available envelope for the environmental control system is usually quite small.

It would also be desirable for a lower pressure drop across the water extractor. A lower pressure drop would allow for greater ECS capacity given the same engine performance, or it would reduce engine fuel consumption given the same ECS capacity.

SUMMARY OF THE INVENTION

The invention may be regarded as a water extractor including a swirl section; and a water collector downstream of the swirl section. The water collector includes separate first and second sumps. The second sump is downstream of the first sump. The first sump has an inlet in fluid communication with the outlet of the swirl section; and the second sump has an inlet downstream of the inlet of the first sump.

The two separate sumps allow the water collector to be placed closer to the swirl section. Water droplets that are not captured by the first sump can be captured by the second sump. Moving the water collector closer to the swirl section reduces the overall length, size and weight of the water extractor.

BRIEF DESCRIPTION OF THE DRAWINGS

FIG. 1 is an illustration of a water extractor according to the present invention;

FIG. 2a is a cross-sectional view of the water extractor taken along lines 2a—2a in FIG. 1;

FIG. 2b is a cross-sectional view of the water extractor taken along lines 2b—2b in FIG. 1;

DETAILED DESCRIPTION OF THE INVENTION

Figure 3:
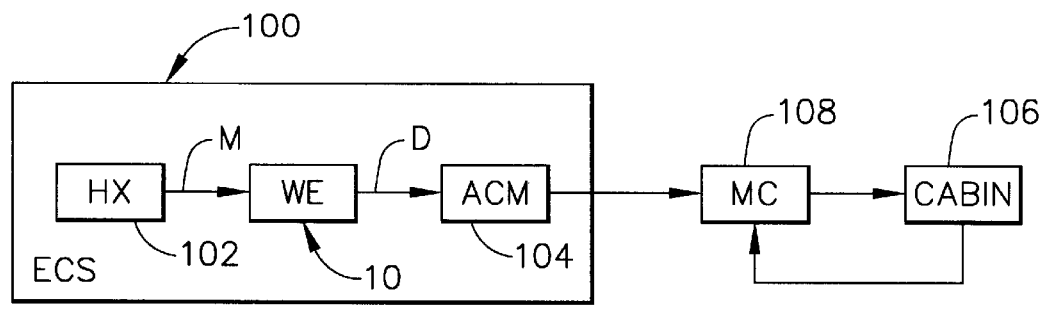
FIG. 3 is an illustration of the water extractor adapted for performing high-pressure water separation in an environmental control system.

FIG. 1 shows a water extractor 10 for removing water droplets entrained in an air stream. The water extractor 10 includes a swirl section 12, a water collector section 14 downstream of the swirl section 12, a primary duct 16 for placing an outlet of the swirl section 12 in fluid communication with an inlet of the water collector section 14, and a secondary duct 18 extending from an outlet of the water collector section 14. The water collector section 14 includes an outer collector duct 20, an inner collector duct 22, and a partition 24 extending between the outer and inner collector ducts 20 and 22. The collector ducts 20 and 22 and the partition 24 form separate upstream and downstream sumps 26 and 28, respectively.

An inlet 30 of the upstream sump 26 is defined by a downstream portion of the primary duct 16 and an upstream portion of the inner collector duct 22. If those portions of the primary duct 16 and inner collector duct 22 are made to overlap, as shown in FIGS. 1 and 2a, the upstream sump inlet 30 may have an annular shape.

An inlet 32 of the downstream sump 28 is defined by an upstream portion of the secondary duct 18 and a downstream portion of the inner collector duct 22. If those portions of the secondary duct 18 and the inner collector duct 22 are made to overlap, as shown in FIGS. 1 and 2b, the downstream sump inlet 32 may also have an annular shape.

The inlet 30 of the upstream sump 26 may be slightly larger or smaller than the inlet 32 of the downstream sump 28 (compare FIGS. 2a and 2b). Decreasing the size of the upstream sump inlet 30 (e.g., by enlarging the upstream portion of the inner collector duct 22) has been found to reduce pressure drops across the water extractor 10. The difference in size between the inlets 30 and 32 may be achieved by making the diameter of the downstream end of the inner collector duct 22 larger or smaller than the upstream end of the inner collector duct 22. For example, the gap between the inner surface of the primary duct 16 and the outer surface of the inner collector duct 22 (upstream portion) might be about three-eighths of an inch, while the gap between the outer surface of the inner collector duct 22 (downstream portion) and the inner surface of the secondary duct 18 might be about one-quarter of an inch. These gap sizes might be used for a primary duct 16 having a diameter of six inches. The gap sizes may be varied for primary ducts of different sizes.

The outer collector duct 20 has a larger cross-sectional area than either the primary duct 16 or the secondary duct 18. Expansion from the primary duct 16 to the outer collector duct 20 may be gradual or abrupt. The expansion from the secondary duct 18 to the outer collector duct 20 may be gradual or abrupt. FIG. 1 happens to show a gradual expansion.

The water extractor 10 may be constructed of a standard material such as aluminum. The ducts 16, 18, 20 and 22 may have cylindrical shapes or conical shapes, either expanding or contracting.

During operation of the water extractor 10, a stream (indicated generally by the letter M) of air having entrained water droplets enters an inlet of the swirl section 12 at a speed of, for example, between fifty and a hundred feet per second. The swirl section 12 includes a static swirl vane, which imparts a centrifugal swirl on the mixture of air and entrained water droplets. The centrifugal swirl causes the heavier water droplets S1 (shown in solid lines) to be separated from the dry air (indicated generally by reference letter D and shown in dashed lines). The water droplets S1 are thrown downstream and outward against the inner surface of the primary duct 16.

The water droplets S1 travel along the inner surface of the primary duct 16 in the direction of the air flow and enter the upstream sump inlet 30. Those water droplets S1 entering the upstream sump inlet 30 are accumulated in the upstream sump 26.

The inlet 30 of the upstream sump 26 may be positioned further downstream to capture all of the water droplets S1 thrown against the inner surface of the primary duct 16. However, this is not necessary. Instead, the upstream sump inlet 30 may be positioned closer to the swirl section 12 to capture the bulk (e.g., approximately 80%) of the water droplets S1, thereby allowing for a shorter extractor length.

Water droplets S2 thrown beyond the primary duct 16 are thrown against an inner surface of the inner collector duct 22. As the dry air D flows past the downstream edge of the inner collector duct 20 and expands into the larger-diameter secondary duct 18, a low pressure zone is created in the downstream sump inlet 32. Water droplets S2 swirling on the inner surface of the inner collector duct 22 follow the surface of the inner collector duct 22 in the direction of the air stream D, reach the edge of the inner collector duct 22, curl around a lip at the downstream end of the inner collector duct 22, and reverse direction (relative to the direction of the primary air stream). In this manner, additional water droplets S2 enter the downstream sump inlet 32. The additional water droplets S2 then enter into the downstream sump 28, via holes or slots in the secondary duct 18.

The dry air D exits the water collector section 14 via the secondary duct 18. The air D exiting the water collector section 14 has a lower humidity than the air M entering the swirl section 12.

During operation of the water extractor 10, the upstream sump 26 will have a higher pressure than the downstream sump 28. For this reason, the partition 24 should allow substantially no fluid communication between the upstream and downstream sumps 26 and 28.

The secondary duct 18 may extend into the water collector section 14 to form a flow path for the additional droplets S2 and to keep the accumulated droplets in the upstream sump 28 away from the turbulent air flow. FIG. 1 happens to show the secondary duct 18 extending into the water collector section 14 in such a manner. Holes or slots may be placed in the secondary duct 18 adjacent to the partition 24 to allow the additional water droplets S2 to flow into the downstream sump 28.

Water accumulated in the upstream and downstream sumps 26 and 28 may be drained via bosses 34 and 36 extending from the outer collector duct 20. At least one drain boss 34 may be provided for draining the water accumulated in the upstream sump 26, and at least one drain boss 36 may be provided for draining the water accumulated in the downstream sump 28. If the water extractor 10 is used in an aircraft environmental control system, the drained water may be dumped overboard or used to cool other equipment (e.g., heat exchangers) of the environmental control system.

The water extractor 10 may be adapted for use in different types of environmental control systems. For example, FIG. 3 shows the water extractor 10 adapted for high pressure water separation in a first aircraft environmental control system 100. In addition to including the water extractor 10, the first environmental control system 100 includes at least one heat exchanger 102 and an air cycle machine 104. The heat exchanger 102 removes compression heat from an incoming air stream, which may be provided by a source such as a compressor stage of an aircraft engine. The water extractor 10 removes water droplets entrained in the air leaving the heat exchanger 102. The air leaving the water extractor 10 is supplied to the air cycle machine 104. Cooled, conditioned air leaving the air cycle machine 104 may be supplied directly to an aircraft cabin 106 or supplied indirectly to the cabin 106 via a mixing chamber 108.

Figure 4:
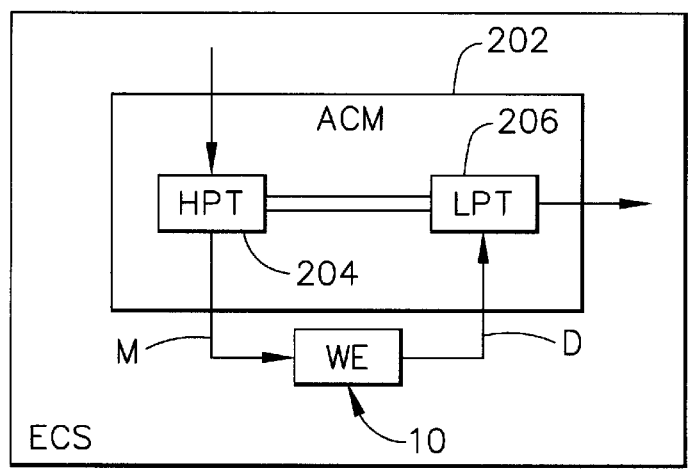
FIG. 4 is an illustration of the water extractor adapted for performing mid-pressure water separation in an environmental control system.

FIG. 4 shows the water extractor 10 adapted for mid-pressure water separation in a second aircraft environmental control system. In addition to including the water extractor 10, the second environmental control system includes an air cycle machine 202 having a high pressure cooling turbine stage 204, a low pressure cooling turbine stage 206 and perhaps one or two additional stages (the additional stages not being shown). The high pressure cooling stage 204 expands incoming air, the water extractor 10 removes water droplets from the expanded air leaving the high pressure cooling stage 204, and the low pressure cooling stage 206 further expands the air leaving the water extractor 10. Cooled, conditioned air leaving the low pressure cooling stage 206 can be supplied directly to an aircraft cabin or supplied indirectly to the cabin via a mixing chamber. An environmental control system including an air cycle machine having two cooling turbine stages is described in the assignee's U.S. Ser. No. 08/996,742 filed Dec. 23, 1997 ("Single Package Cascaded Turbine Environmental Control System"). U.S. Ser. No. 08/996,742 filed Dec. 23, 1997 and now issued as U.S. Pat. No. 6,070,408 is incorporated herein by reference.

Thus disclosed is a water extractor including a water collector section that can be moved closer to the swirl section. Moving the water collector section closer to the swirl section shortens the overall length of the water extractor. This allows the environmental control system to be packaged in a smaller envelope. The smaller size also creates flexibility in placing the air cycle machine in aircraft bays of different sizes.

Moving the water collector closer to the swirl section shortens the length of the primary duct. Shortening the primary duct, in turn, reduces the weight of the water extractor.

The water extractor doesn't need an external sump. This eliminates the need for an extra component and, therefore increases reliability and further reduces the weight of the environmental control system.

The water extractor provides an airflow path that is virtually straight. This results in a low pressure drop across the water extractor. The low pressure drop allows for greater ECS capacity given the same engine performance, or it reduces engine fuel consumption given the same ECS capacity.

The invention is not limited to the specific embodiments above. For example, the upstream and downstream sumps need not be contiguous. Instead, the upstream and downstream sumps may be separated by a distance.

Additional slots in the inner collector duct 22 may feed additional water into the upstream sump 26. Additional slots in the inner collector duct 22 may feed more water into the upstream sump inlet 32. Additional slots in the secondary duct 18 may feed water into the downstream sump 28.

Accordingly, the invention is not limited to the specific embodiments above. Instead, the invention is construed according to the claims that follow.

We claim:

1. A water extractor connected to an outlet duct, the water extractor comprising:
   a swirl section having an outlet; and
   a water collector section downstream of the swirl section, the water collector section including separate first and second sumps the first sump having an inlet in fluid communication with the outlet of the swirl section, the second sump having an inlet downstream of the inlet of the first sump, the inlet of the second sump being in fluid communication with the outlet of the swirl section via an air passageway;
   the air passageway expanding at the inlet of the second sump and into the outlet duct.

2. The water extractor of claim 1, wherein the inlet of the first sump is positioned to directly receive air leaving the swirl section, and wherein the inlet of the second sump is positioned such that the air leaving the swirl section flows past the second sump inlet.

3. The water extractor of claim 1, further comprising a primary duct connecting the inlet of the water collector section to the outlet of the swirl section; and wherein the water collector section includes an outer collector duct, an inner collector duct, and a partition extending between the inner and outer collector ducts, the collector ducts and the partition forming the first and second sumps, the first sump inlet being defined by a downstream portion of the primary duct and an upstream portion of the inner collector duct, the second sump inlet being defined by an upstream portion of the outlet duct and a downstream portion of the inner collector duct.

4. The water extractor of claim 3, wherein the partition allows substantially no fluid communication between the first and second sumps.

5. The water extractor of claim 3, wherein the upstream portion of the inner collector duct and the downstream portion of the primary duct overlap to form an inlet having an annular shape; and wherein the downstream portion of the inner collector duct and the upstream portion of the secondary duct overlap to form an inlet having an annular shape.

6. The water extractor of claim 5, wherein the inlet of the first sump is larger than the inlet of the second sump.

7. The water extractor of claim 3, wherein the primary duct and the inner collector duct are virtually straight.

8. The water extractor of claim 1, further comprising at least one drain port for the first sump and at least one drain port for the second sump.

9. A water extractor comprising:
   an inner collector duct;
   a partition;
   an outer collector duct surrounding the inner collector duct; and
   a secondary duct;
   the collector ducts and the partition forming an upstream sump, the secondary duct, the outer collector duct and the partition forming a downstream sump, the secondary duct surrounding a portion of the inner collector duct to form an inlet of the downstream sump.

10. The water extractor of claim 9, wherein the partition allows substantially no fluid communication between the upstream and downstream sumps.

11. The water extractor of claim 9, wherein the inlet of the upstream sump is larger than the inlet of the downstream sump.

12. The water extractor of claim 9, wherein the primary duct and the inner collector duct are virtually straight.

13. An environmental control system for conditioning and cooling an incoming stream of air, the system comprising:
   an air cycle machine for expanding the air; and
   a water extractor for removing water droplets entrained in the air, the water extractor including a swirl section and a water collector section downstream of the swirl section, the water collector section including separate first and second sumps, the second sump being downstream of the first sump, the inlet of the second sump being in fluid communication with the outlet of the swirl section via an air passageway, water droplets on an inner surface of the passageway being drawn into the inlet of the second sump by a Coanda affect when the air is flowing down the passageway.

14. The environmental control system of claim 13, wherein the air cycle machine includes high and low pressure cooling turbine stages, wherein an inlet of the swirl section is coupled to an outlet of the high pressure cooling turbine stage, and wherein an outlet the water collector section is coupled to an inlet of the low pressure cooling turbine stage, whereby the water extractor is adapted to perform mid-pressure water separation.

15. The environmental control system of claim 13, wherein the water collector section includes a primary duct connecting to an outlet of the swirl section; a secondary duct extending from an outlet of the water collector section; an outer collector duct, an inner collector duct, and a partition extending between the inner and outer collector ducts, the collector ducts and the partition forming the first and second sumps, the first sump inlet being defined by a downstream portion of the primary duct and an upstream portion of the inner collector duct, the second sump inlet being defined by an upstream portion of the secondary duct and a downstream portion of the inner collector duct.

16. The environmental control system of claim 15, wherein the partition allows substantially no fluid communication between the first and second sumps.

17. The environmental control system of claim 15, wherein the inlet of the first sump is larger than the inlet of the second sump.

18. The environmental control system of claim 15, wherein the primary duct and the inner collector duct are virtually straight.

19. The water extractor of claim 1, further comprising at least one drain port upstream of the inlet of the second sump.

20. The water extractor of claim 9, further comprising at least one drain port upstream of the inlet of the downstream sump.

\* \* \* \* \*